United States Patent [19]
Doweidt et al.

[11] Patent Number: 6,059,559
[45] Date of Patent: May 9, 2000

[54] REMOTE FEED STOCK UNIT FOR AN INJECTION MOLDING MACHINE

[76] Inventors: Dennis P. Doweidt; Jo Doweidt, both of 2241 W. Cherokee Ct., Nixa, Mo. 65714

[21] Appl. No.: 09/098,144

[22] Filed: Jun. 16, 1998

[51] Int. Cl.⁷ .................................................. B28B 13/02
[52] U.S. Cl. .................................... 425/585; 425/586
[58] Field of Search ........................ 425/585, 586

[56] References Cited

U.S. PATENT DOCUMENTS

| | | | |
|---|---|---|---|
| 485,282 | 11/1892 | Lang | 425/585 |
| 2,418,856 | 4/1947 | Stacy | 425/585 |
| 2,448,947 | 9/1948 | Arthur et al. | 425/585 |
| 2,689,376 | 9/1954 | Wacker . | |
| 3,515,203 | 6/1970 | Parlanti et al. | 425/585 |
| 4,422,842 | 12/1983 | Monnet | 425/561 |
| 4,599,210 | 7/1986 | Jennett | 264/40.5 |
| 4,804,110 | 2/1989 | Sperry | 222/56 |
| B1 4,557,683 | 12/1985 | Meeker et al. | 425/147 |

*Primary Examiner*—Tim Heitbrink
*Attorney, Agent, or Firm*—Richard L. Marsh

[57] ABSTRACT

A stuffer device for supplying a substantially continuous stream of elastomeric feed stock in a fluid state to an inlet port of at least one injection molding machine is provided. The device comprises a feed stock advancing unit remote from an injection molding machine having a conduit associated therewith connecting the feed stock advancing unit to the inlet port of the injection molding machine and a controller for the feed stock advancing unit to provide a measured amount of feed stock to the inlet port commensurate with the needs of each injection cycle.

19 Claims, 7 Drawing Sheets

REMOTE FEED STOCK UNIT FOR AN INJECTION MOLDING MACHINE

BACKGROUND OF THE INVENTION

1. Field of the Invention

This invention relates to a means for feeding the inlet port of an injection machine. Such a means is commonly called a stuffer.

2. Prior Art Statement

It is known to provide a means to discharge a preformed charge of a thermoplastic material enveloped in a congealed skin in a container into the injection chamber of an injection molding machine through the open end of the container by applying compressed air to the closed end of the container. For instance, see the U.S. Pat. No. 2,689,376 to George Wacker issued on Sep. 21, 1954.

It is also known to provide a material supply device for an injection molding machine which is mounted to and movable with a movable sheath containing an inlet for the injection screw or cylinder and for a container which may be filled separately mountable to the supply funnel of the injection machine inlet port. For instance, see the U.S. Pat. No. 4,422,842 to Bernard Monnet issued on Dec. 27, 1983.

It is further known to provide a rotary processor for plasticating polymeric material, an accumulator chamber adapted to receive the plasticated material having a piston in a cylinder biased toward a reduced volume, an injection unit comprising a barrel and an injector ram reciprocable in the barrel and valving means between these three portions to direct the plasticated material toward the accumulator chamber or the injection unit. For instance, see the U.S. Pat. No. 4,557,683B1 to Meeker, et al. issued on Dec. 10, 1985.

Additionally, it is known to provide a machine for making a slug of raw rubber stock for use in an injection molding process by continuously feeding an extruder with strip stock, masticating and heating the stock in the extruder barrel and discharging same into an expanding cavity having a moving bottom bolster. For instance, see the U.S. Pat. No. 4,599,210 to James Jennett issued on Jul. 08, 1986.

Finally, it is known to provide a means to advance a solid rod form of thermoplastic to a hot glue gun by mechanical means within the glue gun wherein the solid rod is fed through a flexible conduit from a reel dispensing device. For instance, see the U.S. Pat. No. 4,804,110 to Charles R. Sperry issued on Feb. 14, 1989.

SUMMARY OF THE INVENTION

A stuffer mounted on an injection molding machine is described in the Monnet patent, U.S. Pat. No. 4,422,842, but requires an operator to place a slug of material in the stuffer atop the machine. Since the inlet port of an injection molding machines is often elevated above the floor mounted machine, the operator may need to climb a ladder in order to feed the stuffer. It is difficult to transport a significant weight of material and climb a ladder without creating a dangerous situation for the operator. Therefore, the injection machine must be continually fed with small slugs of material by the operator or by a helper thereby resulting in a lowered production rate and/or a higher production cost.

It is an object of this invention to provide a stuffer device for supplying a substantially continuous stream of elastomeric feed stock in a fluid state to an inlet port of at least one injection molding machine.

It is another object of this invention to provide a device at operator level for supplying an inlet port of an injection molding machine.

It is yet another object of this invention to provide a cartridge for use with a device for supplying a substantially continuous stream of elastomeric feed stock in a fluid state to an inlet port of an injection molding machine.

It is still another object of this invention to provide a stuffer device for supplying a substantially continuous stream of elastomeric feed stock in a fluid state to an inlet port of an injection molding machine wherein the device has a feed stock advancing unit remote from the injection molding machine.

It is yet another object of this invention to provide a system of injection molding elastomeric compound, wherein the system comprises at least one injection molding machine, a mold for the injection molding machine and a stuffer device for supplying a substantially continuous stream of elastomeric feed stock in a fluid state to an inlet port of the injection molding machines where the stuffer device comprises a feed stock advancing unit remote from the injection molding machine and has a conduit associated therewith connecting the feed stock advancing unit to each inlet port, the system further having means for controlling the feed stock advancing unit to provide a measured amount of feed stock to the inlet ports commensurate with the needs of each injection cycle.

An additional object of this invention is to provide a flexible conduit connecting the feed stock advancing unit of a stuffer device to each inlet port of associated injection molding machines.

Yet a further object of this invention is to provide flexible conduit comprising a high pressure hose having an elastomeric inner tube, multiple wire reinforcement layers and an elastomeric outer cover.

Still a further object of this invention is to provide a cartridge for a stuffer device for supplying a substantially continuous stream of elastomeric feed stock in a fluid state to an inlet port of at least one remote injection molding machine wherein the cartridge comprises a right circular cylinder having a first open end, a second open end and a length greater than the diameter thereof, a means for transporting associated therewith, a means for being captured in the device and means for permitting discharge of entrapped volatile material, the means for permitting discharge associated with the ends.

A further object of this invention is to provide a cartridge which is received in a register recess in a lower plate, an upper plate having a register recess disposed in a lower surface thereof, the upper plate being then moved toward the lower plate, the lower plate having received the cartridge in the register recess therein, the upper plate further advancing and clamping the cartridge between the recesses.

Another object of this invention is to provide a means to receive an elongated cartridge which comprises means to guide one end of a cartridge within the receiving station.

Yet an additional object of this invention is to provide a stuffer device having a means to guide one end of a cartridge which comprises an elongated converging slot in a plane below a top surface of a lower plate of the device wherein the slot terminates in a circular register recess in the lower plate constituting means to initially center the cartridge.

Yet a further object of this invention is to provide a cartridge which is received in a register recess centrally disposed about a means to transfer in an upper plate comprising a discharge port formed through the upper plate adapted to direct flow of viscous feed stock.

It is a further object of this invention to provide a stuffer device having a receiving station with means to capture an elongated cartridge between a piston and a discharge port, means to clamp the elongated cartridge between a discharge port plate and lower receiving plate, means to advance the piston into the cartridge through the lower plate forcing the fluid polymer feed stock into contact with the discharge port and any remaining polymer contained therein, the advance of the piston causing any volatile material entrained in the polymer to be forced under high pressure to vent through a means for discharging volatile gasses associated with the discharge port.

Those skilled in the art will recognize an object of this invention is to provide a means to transfer comprising a tapering section converging from an upper register recess to a discharge port having at least one conical section and may further comprise a plurality of conical sections, each successive conical section having an increasing angle of convergence.

DESCRIPTION OF THE PREFERRED EMBODIMENTS

While the various features of this invention are hereinafter described and illustrated as a stuffer device for an injection molding machine and a process of supplying a substantially continuous stream of elastomeric material feed stock in a fluid state to an inlet port of at least one injection molding machine, it is to be understood that the various features of this invention can be used singly or in various combinations thereof in a process of supplying a substantially continuous stream of feed stock in a fluid state to other machines or molding objects as can hereinafter be appreciated from a reading of the following description.

Figure 1:
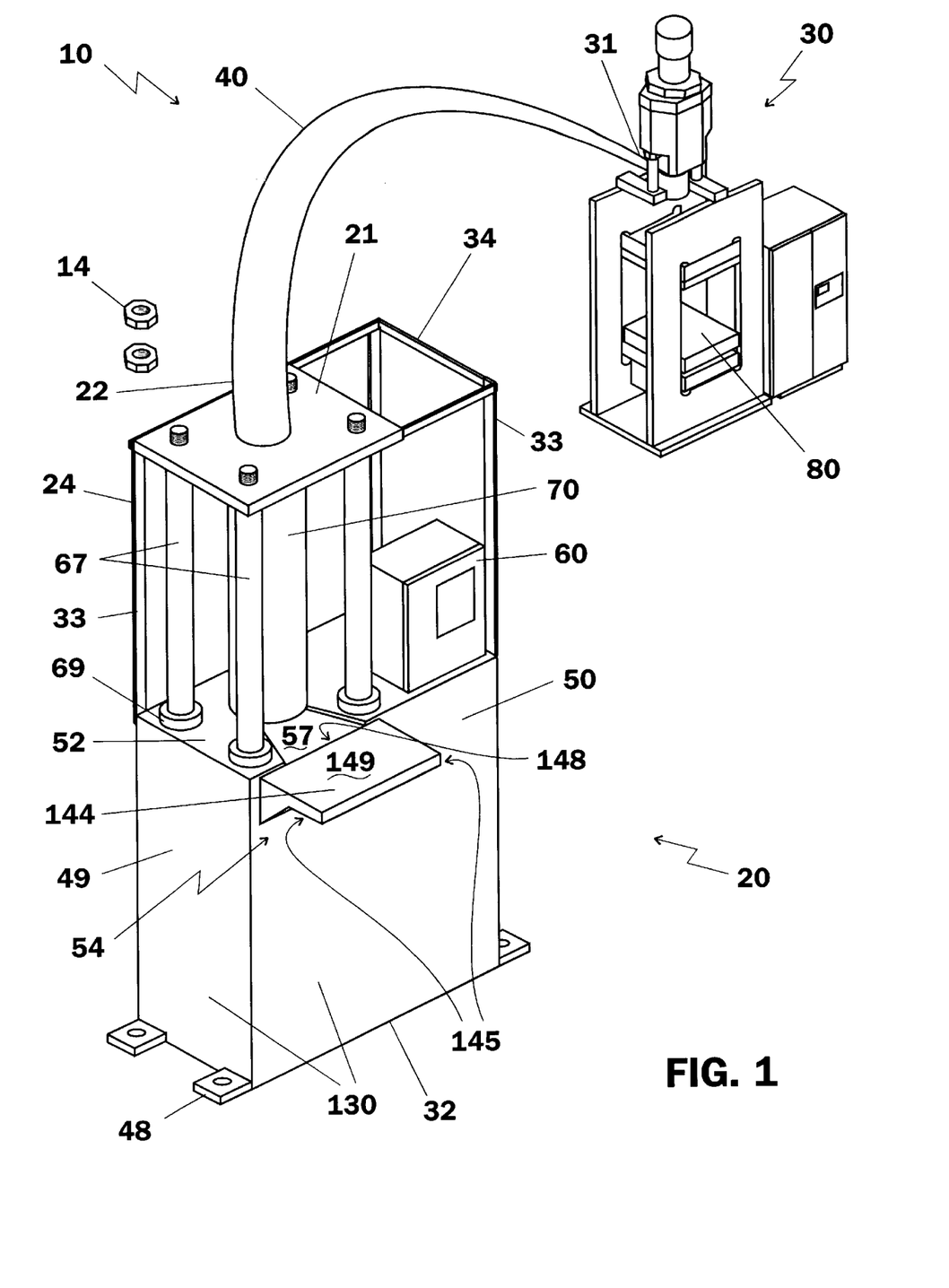
FIG. 1 is a perspective view of an embodiment of the injection molding system of this invention showing a stuffer of this invention in the foreground and an injection molding machine in the background.

Referring now to FIG. 1, an injection molding system generally shown by the number 10 comprises at least one injection molding machine 30, an injection mold 80 in injection molding machine 30 and a stuffer device 20 for supplying a substantially continuous stream of elastomeric feed stock in a fluid state to an inlet port 31 of at least one injection molding machine 30. Stuffer device 20 comprises a feed stock advancing unit 50 shown remote from injection molding machine 30 having at least one conduit 40 associated therewith connecting feed stock advancing unit 50 to each inlet port 31 and has means for controlling 60 associated with and controlling feed stock advancing unit 50 to provide a measured amount of feed stock to inlet port 31 commensurate with the needs of each injection cycle. Conduit 40 is generally a flexible conduit such as a high pressure hose having an elastomeric inner tube, multiple wire reinforcement layers and an elastomeric outer cover, but may be a rigid conduit permanently affixed to feed stock advancing unit 50 and inlet port 31 where stuffer device 20 is intended to be utilized solely with one or more machines 30 on a permanent basis.

Figure 2:
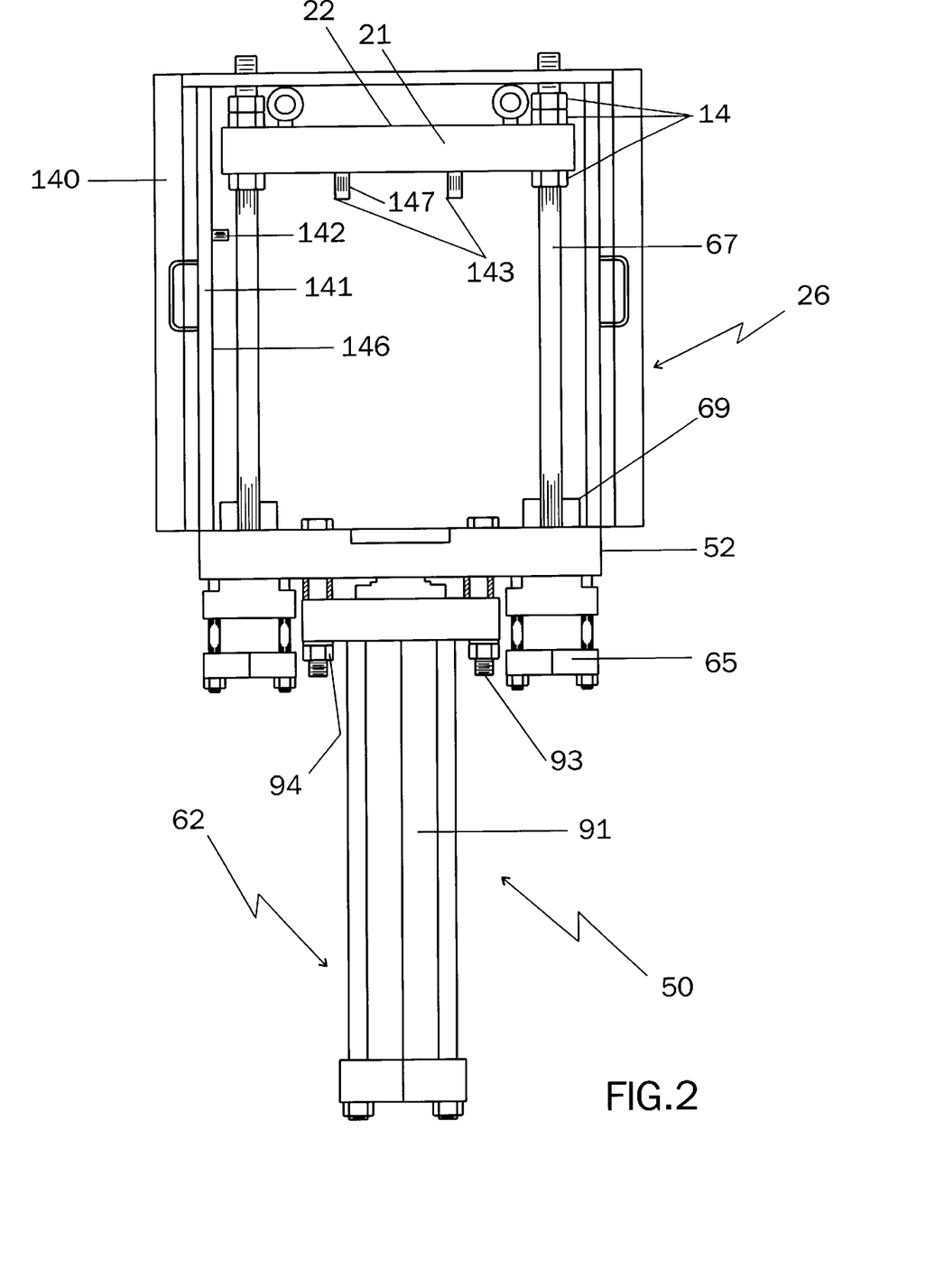
FIG. 2 is a frontal elevation view of the preferred embodiment of the feed stock advancing unit of the stuffer with portions of the frame and outer cabinet removed showing the arrangement of the feed stock advancing cylinder and means to clamp a cartridge between a lower plate and an upper plate.
Figure 3:
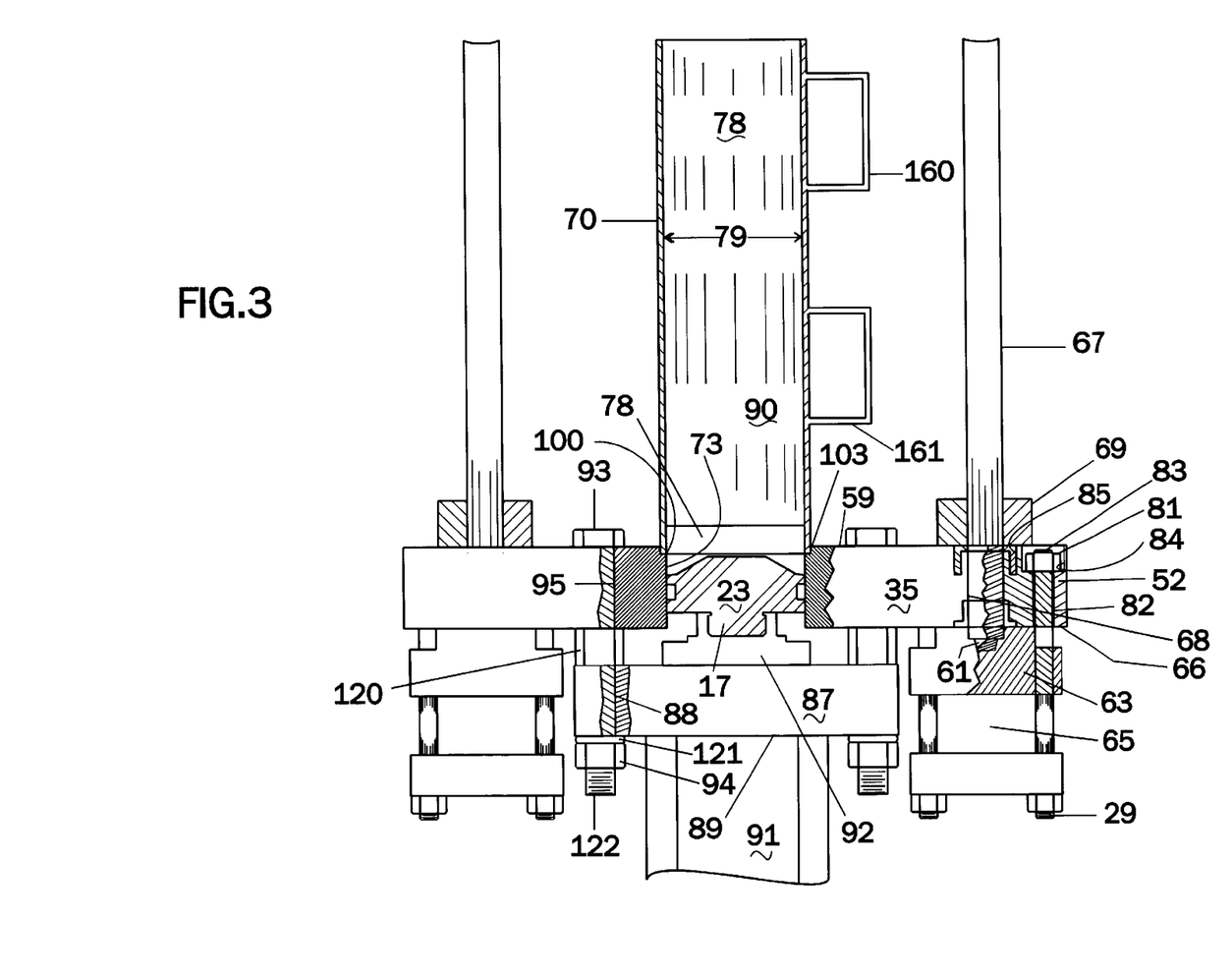
FIG. 3 is an enlarged view of the lower plate and the lower end of the cartridge showing portions thereof in cross section with the piston retracted to its lowermost position.

Referring now to FIG. 2 and FIG. 3, feed stock advancing unit 50 has an upper clamping plate 21 and lower clamping plate 52, the upper clamping plate 21 moveable toward the lower clamping plate 52. Means to clamp 26, comprising cylinders 65, support and guide rods 67, upper plate 21 and lower plate 52, operates to draw upper plate 21 toward lower plate 52 clamping a removable cartridge 70 therebetween as will hereinafter be fully described. In the preferred embodiment, means to clamp 26 comprises at least two short stroke hydraulic cylinders 65 affixed to a bottom surface 66 of lower plate 52 having the clamping rod 63 of each cylinder 65 affixed to a support and guide rod 67. Support and guide rod 67 is adapted to move freely through a precision bore 68 disposed through lower plate 52 and through bushings 69 mounted on top surface 59 of lower plate 52. Bushings 69 may be made of bronze or other suitable bushing material and are generally mounted to lower plate 52 by press fitting into precision bores 85 or by threading into threaded holes within precision bores 85.

As best observed in FIG. 3, each clamping cylinder 65 of means to clamp 26 has mounting bolts 29 disposed through bores 82 in lower plate 52 with nuts 81 threaded upon the open ends 83 thereof Nuts 81 are shown recessed into counterbores 84 in top surface 59 of lower plate 52 but need not be so. In the preferred embodiment, four cylinders 65 are utilized on the orthogonal corners of lower plate 52 and precision bores 68 are aligned with corresponding precision bores 51 in upper plate 21. Centrally disposed on bottom surface 66 of lower plate 52 is a stock advancing hydraulic cylinder 91 having a central rod 92 with stock advancing piston 23 mounted upon its open end 86 (see FIG. 6). Stock advancing cylinder 91 is mounted to lower plate 52 by at least two, and preferably four, bolts 93 passing through bores 95 in lower plate 52 and mounting holes 88 in cylinder end plate 87. Bolts 93 pass through lower plate 52 from top surface 59 through a spacer 120 if needed and then through mounting holes 88. Nuts 94 with lock washers 121 are placed upon the end 122 of each bolt 93 and are secured thereupon by tightening each nut 94 against an associated lock washer 121 against the base surface 89 of cylinder end plate 87. Thus, stock advance cylinder 91 is mounted square with rigid lower plate 52 and has piston 23 centrally disposed in an aligning bore 73 in lower plate 52. Aligning bore 73 is a resting port for piston 23 at its lowermost retracted position.

Lower plate 52 is disposed approximately midway between base 32 and top 33 in frame work 24. A sheet metal outer covering 130 surrounds a portion of frame work 24 and lower plate 52 and thus comprises a lower portion 49 of stock advancing unit 50 as shown in FIG. 1. Lower portion 49 also envelopes stock advance cylinder 91, hydraulic clamping cylinders 65, the associated hydraulic tubing, a hydraulic pumping unit and a distribution manifold. Electrically actuated hydraulic valves are mounted on the distribution manifold and are controlled by controlling means 60. Lower portion 49 has mounting tabs 48 for affixing stuffer device 20 to a permanent location or for mounting to an easily portable base for rapid movement by fork truck.

Figure 5:
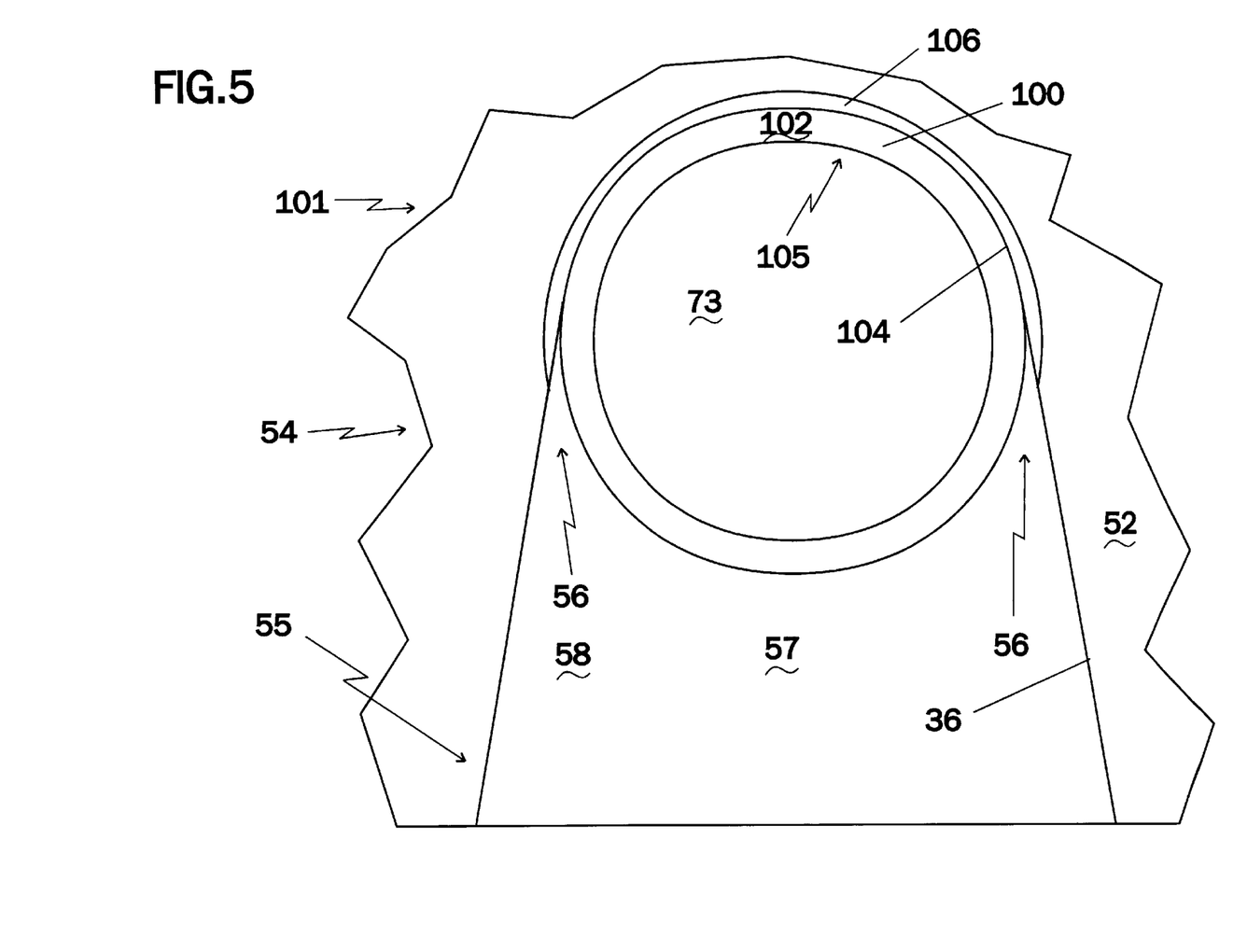
FIG. 5 is a greatly enlarged plan view of the central portion of the lower plate of this invention broken away to show a means to center the cartridge.
Figure 6:
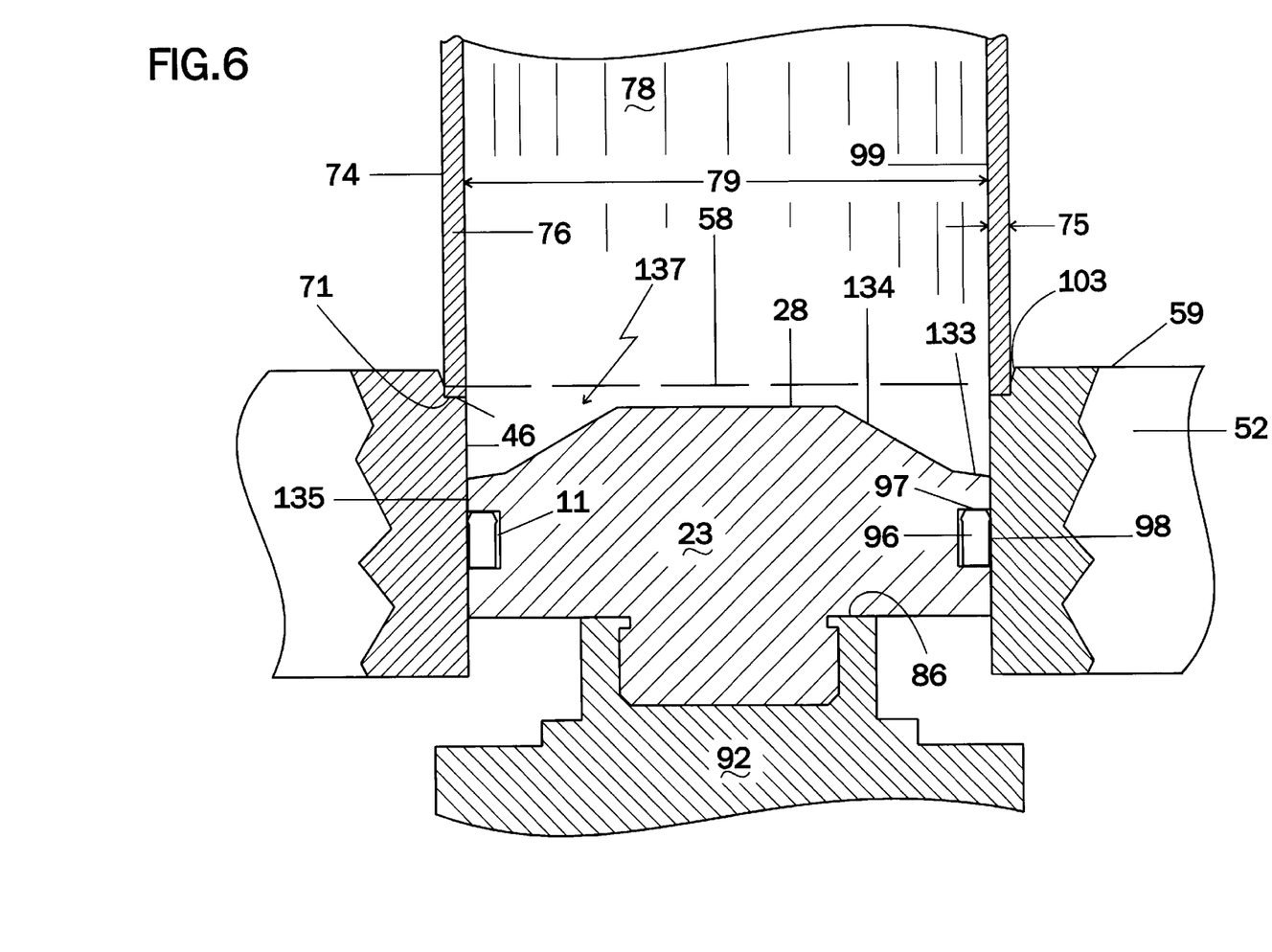
FIG. 6 is a greatly enlarged sectional view of the central portion of the lower plate showing the feed stock advancing piston in its lowermost position.

As best understood by referring to FIG. 1, FIG. 5 and FIG. 6, feed stock advancing unit 50 has a receiving station 54 associated with lower plate 52. Receiving station 54 has means to receive 55 one end 71 of an elongated feed stock cartridge 70 thereupon in order to place cartridge 70 in position to receive stock advancing piston 23 therein for ultimately forcing feed stock 90 from cartridge 70 through conduit 40 to inlet port 31. Means to receive 55 comprises means to guide 56, means to center 101, interlock shelf 144 and means to capture 105 cartridge 70 in lower plate 52 all cooperating to assist in placing cartridge 70 in position within stock advancing unit 50 to ready cartridge 70 for transferring feed stock 90 to injection molding machine 30. Means to receive 55 accepts one end 71 of cartridge 70 within receiving station 54 when one end 71 is placed upon a flat portion thereof. Means to guide 56 comprises an elongated converging slot 57 having substantially vertical walls 36 and a tapering conical wall 106 extending from walls 36, converging slot 57 being disposed in a plane 58 below top surface 59 of lower plate 52. Elongated converging slot 57 begins at a front edge 35 of lower plate 52, extends along plane 58 toward a central portion of lower plate 52 and terminates at a means to center 101 centrally disposed in lower plate 52. Walls 36 of converging slot are generally perpendicular to plane 58 and extend from front edge 35 to means to center 101. Means to center 101 is defined by register pegs 143, stop fingers 142, tapering conical wall 106 and a circular register recess 100 having its base 102 disposed in a plane below plane 58. Tapering conical wall 106 is defined by an outwardly diverging angle 103 beginning substantially at plane 58 extending to top surface 59. Right circular cylindrical wall 104 of circular register recess 100 extends from plane 58 downward into lower plate 52 to base 102 a sufficient depth to capture cartridge 70 therein causing cartridge 70 to stand vertically upon base 102 in perpendicular relationship to lower plate 52. Typically, converging slot 57 is approximately three sixteenths inch deep from top surface 59 to plane 58 and circular register recess 100 is approximately one eighth inch deep from plane 58 to base 102. Circular register recess 100, right circular cylindrical wall 104 and base 102 comprise means to capture 105 one end 71 of said cartridge 70 as right circular cylindrical wall 104 is substantially the same diameter as outer peripheral surface 74 of cartridge 70 and base 102 is substantially the same width as thickness 75 of cartridge wall 76. Outwardly diverging angle 103 of means to center 101 is formed on an extension of wall 36 forming conical wall 106. Outwardly diverging angle 103 is typically between 8 and 20 degrees, most preferably about 15 degrees from the vertical. When cartridge 70 is presented to means to center 101, outwardly diverging angle 103 directs cartridge 70 into a centering relationship with means to center 101, cartridge 70 then drops downwardly into means to capture 105 resting upon base 102. Thus, approximately five sixteenths inch of cartridge 70 is disposed below top surface 59 of lower plate 52 and initially captured in vertical relationship within means to capture 105.

Figure 4:
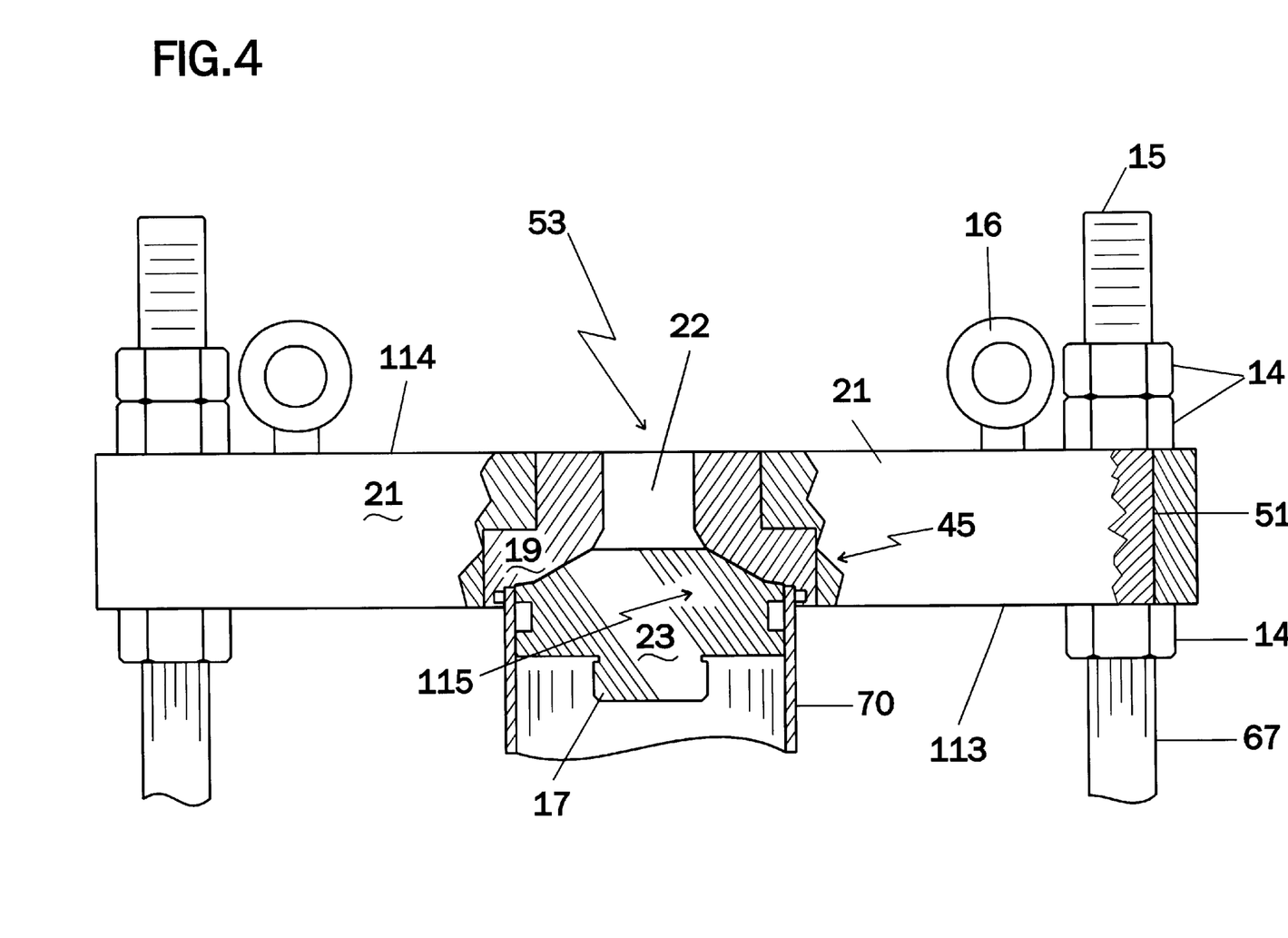
FIG. 4 is an enlarged view of the upper plate and the upper end of the cartridge showing portions thereof in cross section with the piston advanced to its uppermost position.
Figure 7:
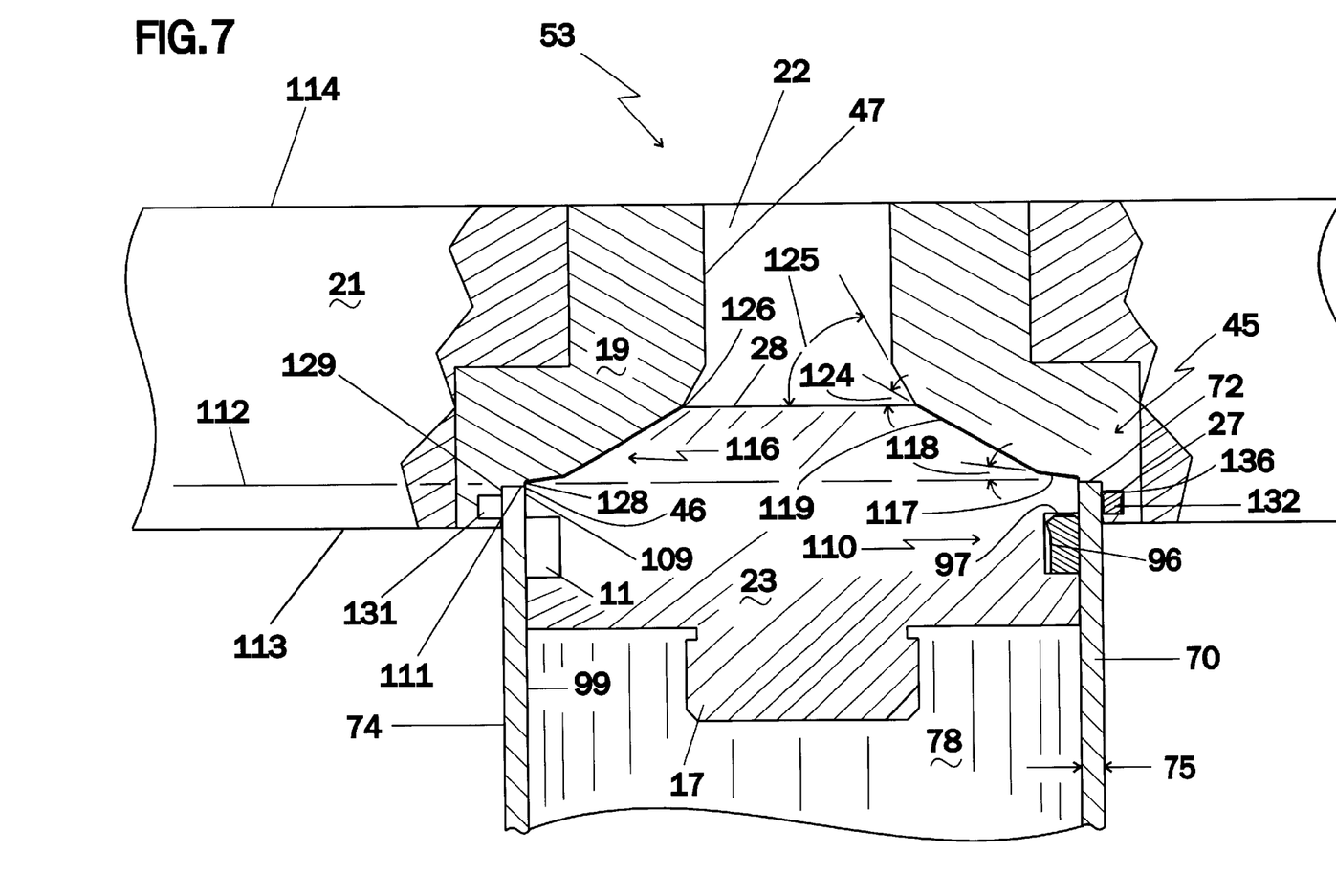
FIG. 7 is a greatly enlarged sectional view of the central portion of the upper plate showing the feed stock advancing piston in its uppermost position.

Spaced above top surface 59 of lower plate 52 is upper plate 21, upper plate 21 having a means to transfer 53 feed stock 90 to at least one injection molding machine 30 associated therewith. Referring to FIG. 4 and FIG. 7, upper plate 21 has means to transfer 53 which comprises a means to direct flow 115 and a discharge port 22 formed through plate 21 to top surface 114. Specifically, discharge port 22 is generally a right circular bore through an insert 19 disposed in upper plate 21 having inner port surface defined by bore 47 extending above means to direct flow 115 to top surface 114 and terminating in a means to attach conduit 40. Discharge port 22 may have threads disposed on the interior thereof within bore 47 to accept a threaded connector of a hydraulic hose or pipe. Means to direct flow 115 has a short straight section 128 and a tapering section 116 which may be of any suitable shape corresponding to a top surface 28 of piston 23. Means to direct flow 115 is configured such that feed stock 90 is directed away from other end 72 of cartridge 70. In the preferred embodiment shown in FIG. 7, tapering section 116 comprises at least one and preferably three conical sections 117, 119 and 123 each successive conical section having an increasing angle of taper with respect to the previous conical section. Of course, tapering section 116 could be entirely curvilinear or combined with at least one conical section as long as tapering section 116 corresponds to top surface 28 of piston 23 to cause feed stock 90 to flow from cartridge 70 through means to transfer 53 and out discharge port 22.

As can be readily observed in FIG. 7, feed stock advancing unit 50 has a registering station 110 associated with upper plate 21 to accept cartridge 70 therein for effecting transfer of feed stock 90 therefrom. Short straight section 128 of means to transfer 53 connects means to transfer 53 with registering station 110. Thus, registering station 110 forms the lower boundary of means to transfer 53. As will be hereinafter explained, short straight section 128 allows piston 23 to move beyond the other end 72 of cartridge 70 to uncover a means to discharge gas 45.

Registering station 110 comprises a circular upper register recess 111 in upper plate 21 and register pegs 143 as shown in FIG. 2 associated with upper plate 21, register recess 111 disposed in a plane 112 above a lower surface 113 of upper plate 21 and wherein upper register recess 111 is centrally disposed about means to transfer 53. Registering station 110 is a right circular recess formed from lower surface 113 to plane 112 having a circular wall 129 terminating in a flat base 109 at plane 112. The width of base 109 is substantially the same as thickness 75 of cartridge 70 and circular wall 129 is substantially the same diameter as outer periphery 74 of cartridge 70 and therefore, the diameter 79 of the interior 78 of cartridge 70 is substantially the same diameter as short straight section 128 and equally the same diameter as piston 23. Therefore, piston 23 may easily pass through interior 78 of cartridge 70 and into straight section 128 thereby moving all feed stock 90 from cartridge 70. Circular wall 129 has a height of approximately one half inch sufficient to capture other end 72 of cartridge 70 therein when upper plate 21 is moved toward lower plate 52 by clamping means 26. Circular wall 129 also has an annularly disposed seal recess 131 for receiving a seal 132 therein. Registering pegs 143 are mounted to lower surface 113 of upper plate 21 depending therefrom and having the front surface 147 of each peg 143 aligned with upper circular recess 111. Registering pegs 143 depend from lower surface 113 approximately one and one half inches and are adapted to engage outer peripheral surface 74 of cartridge 70 upon seating cartridge in circular register recess 100. Thus, registering pegs 143 constitute a part of means to center 101 and also cooperate with stop fingers 142 on doors 141 to ensure that cartridge is substantially centered in feed stock advancing unit 50 prior to operating feed stock advancing unit 50.

An unique means to discharge gas 45 is established at other end 72 of cartridge 70 when cartridge 70 is fully seated against flat base 109 in upper circular recess 111. It has been established that piston 23 moves beyond plane 112 when piston 23 is extended to the uppermost end of its stroke thereby removing any feed stock away from flat base 109 at plane 112. As such, when piston 23 is retracted to its lowermost end of stroke and a subsequent cartridge 70 is placed within stock advancing unit 50 and clamped therein by clamping means 26, other end 72 of subsequent cartridge 70 is pressed against flat base 109. Although there is no physical space between flat base 109 and other end 72 of cartridge 70, a path for gas escape is created along plane 112 at a parting line 46 between other end 72 and flat base 109 such that when piston 23 begins to move feed stock 90 within new cartridge 70, any volatile material existing above feed stock 90 and any entrained volatile material within feed stock 90 may pass freely through this path along party line 46, downwardly along outer peripheral surface 74 and past seal 132 in annular seal recess 131. Thus, seal 132, outer peripheral surface 74 and parting line 46 constitute means for discharging volatile gasses 45. Seal 132 is a common packing seal having at least one distinct lip edge 136 adapted to engage outer peripheral surface 74 of cartridge 70. Lip edge 136 readily permits passage of gas as seal 132 does not completely fill annular recess 131 and gasses may pass between contiguous surfaces of seal 132 and annular recess 131 in much the same manner as gas passes along parting line 46.

It should be appreciated here, that although means to discharge gas 45 permits gas to flow, the same surfaces 72, 109 constitute a means to prevent viscous fluid flow 27. As hereinbefore recited, since there is no physical space at parting line 46 between other end 72 and flat base 109, viscous fluid such as feed stock 90 cannot flow through the path established for gasses. In this manner, all of feed stock 90 is directed upwardly along means to direct flow 115 while gasses present are vented through means to discharge gas 45.

Referring again to FIG. 6 and FIG. 7, top 28 of piston 23 has tapered surfaces 137 corresponding to tapering section 116 of means to direct flow 115. In the preferred embodiment, top 28 of piston 23 has at least two angled surfaces 133, 134 corresponding to first conical section 117 and second conical section 119 respectively. The angle of first surface 133 is approximately equal to first angle 118 but may be slightly smaller. Similarly, the angle of second surface 134 should be approximately equal to second angle 124 but may also be slightly smaller. In the preferred embodiment, the angle of each surface 133, 134 is exactly equal to the first angle 118 and second angle 124 thereby creating a uniform clearance 126 between means to direct flow 115 and angled surfaces 133, 134 of top 28 when piston 23 is at its uppermost end of travel. Since means to direct flow 115 comprises a tapering section 116 converging from upper register recess 111 to discharge port 22 and tapering surfaces 137 correspond exactly thereto, feed stock 90 readily travels successively along the plurality of conical sections 117 as each successive conical section 117 has an increasing angle of convergence as measured from the horizontal.

Elongated cartridge 70 is adapted to receive discrete batches of elastomeric feed stock 90 within the interior 78 thereof. As such elongated cartridge 70 is open at both ends 71, 72, cartridge 70 having an interior 78 of specified volume. Feed stock 90 is typically a calendered thermosetting elastomeric compound selected from the group comprising natural rubber, polyisoprene, polyurethane, styrene-butadiene rubber, butyl, silicone, vinyl or blends of the above. Feed stock 90 is generally mixed in a banbury mixer and provided to a calender in billets to be sheeted out in an elongated ribbon of rubber of given thickness, the width thereof corresponding approximately to the width of the calender rolls as is well known in the art. Feed stock 90 is then cut into the discrete lengths at a width roughly equal to the length of cartridge 70, the volume of the rubber sheet being approximately equal to the volume of interior 78 of cartridge 70. The discrete length is then wound tightly from one end to an opposite end thereof to form a tightly rolled roll of calendered elastomeric compound which is telescopically disposed within interior 78 of cartridge 70, cartridge 70 receiving polymeric feed stock 90 in one end 71 or other end 72 thereof. Feed stock 90 may be provided to cartridge in any other manner as well known in the art, however, it has been found by the teachings of this invention that banbury mixed, calendered feed stock 90 is most cost effective.

Cartridge 70 is a right circular cylinder of given length having a wall 76 of thickness 75 and an inside diameter 79. A carrying handle 160 and a manipulating handle 161 are provided on outer peripheral surface 74, carrying handle 160 centrally located between end 71 and end 72 while manipulating handle 161 is approximately equally spaced from handle 160 and end 71. Handle 160 is used to transport cartridge 70 from the calender to stuffer device 20 and is further used in conjunction with manipulating handle 161 to raise cartridge into position onto receiving station 54 within stuffer device 20. Manipulating handle 161 may then be used to move cartridge 70 along means to receive 55 into engagement with circular register recess 100 while carrying handle 160 may be used to balance cartridge 70. Automated handling means may be utilized with stuffer device 20 as well as will be hereinafter described.

Referring now to FIG. 2, feed stock advancing unit 50 has an upper cabinet 140 appended to the frame work 24, upper cabinet 140 having a pair of expanded metal doors 141 on the front side thereof and either expanded metal or solid sheet metal sides on the other sides thereof. In FIG. 2, the doors 141 are shown in the open position each door having at least one stop finger 142 affixed to the inside 146 as shown on the left hand door 141 thereof located proximate but below upper plate 21. A similar stop finger 142 affixed to inside 146 of the right door 141 also engages cartridge 70 near one end 72 when right door 141 is closed cooperating with stop finger 142 on left hand door 141 to ensure that cartridge 70 is properly aligned with registering station 110 in upper plate 21. Lower plate 52 has magnetic catches (not shown) affixed to upper surface 59 adapted to magnetically latch to doors 141 when each is fully closed. In addition to these magnetic catches, electrical micro switches are associated with lower plate 52 and doors 141 such that doors 141 must both be fully closed in order to actuate interlocks 145 to start a clamping and discharging sequence as will be hereinafter described.

Stop fingers 142 on doors 141 are adapted to press cartridge 70 against pegs 143 and thus are in contact with outer periphery 74 of cartridge 70 cooperating with circular register recess 100 in lower plate 52 to guide cartridge 70 into registering station 110 in upper plate. When doors 141 are fully closed and have actuated the microswitches, interlocks 145 may be engaged, each interlock 145 with at least one digit on each hand of the operator. Since interlocks 145 require the digit to be inserted into a blind hole in interlock 145 in order to begin the clamping sequence, there is provided a measure of safety to the operator, stuffer device 20 and cartridge 70 since doors 141 cannot be held closed while still operating interlocks 145.

Referring again to FIG. 1, stuffer device 20 is adapted to be used with an injection molding machine 30 by connecting an end of conduit 40 to inlet port 31 of injection machine 30. Injection molding machine 30 may then be put in service once the injection screw has received sufficient material to begin molding articles. Stuffer device 20 supplies material such as feed stock 90 from means to transfer 53 through conduit 40 to inlet port 31 by receiving a cartridge 70, substantially filled with feed stock 90, in receiving station 54 which has means to capture 105 elongated cartridge 70 between piston 23 and means to transfer 53. Means to clamp 26 elongated cartridge 70 between means to transfer 53 in upper plate 21 and movable lower plate 52 is actuated by a hydraulic system contained within a lower portion 49 of a stock advancing unit 50. A clamping sequence is begun when interlocks 145 are actuated and hydraulic cylinders 65 pull upon support and guide rods 67 causing movable upper plate 21 to be moved toward lower plate 52 capturing cartridge 70 therebetween. One end 71 of cartridge 70 rests upon circular register recess 100 in lower plate 52 and is received in means to transfer 53 at the other end 72 thereof with transfer piston 23 being received in one end 71. Means to advance piston 23 into cartridge 70 through lower plate 52 comprises a hydraulic stock advance cylinder 91, a hydraulic pump, a distribution manifold and the associated electrical and hydraulic connections. Means to advance piston 23 is actuated by an electrical signal signaling the hydraulic valve to begin supplying hydraulic fluid to stock advancing cylinder 91 forcing the polymeric feed stock 90 into contact with discharge port 22 of means to transfer 53 and any remaining polymeric feed stock 90 contained therein, the advance of piston 23 causing feed stock 90 to dome upwardly in the center thereof contacting remaining stock 90 first in the center such that free gasses may de directed to means to discharge gas 45 and any volatile material entrained in polymeric feed stock 90 to be forced under high pressure to vent through means for discharging volatile gasses 45. Piston 23 continues to move upwardly toward means to transfer 53 until all feed stock 90 is moved from cartridge 70 into and through means to transfer 53 and piston 23 reaches the top of its stroke. When the top of the piston stroke is reached a means to retract 62 is actuated and piston 23 is caused to retract toward its lowermost position. Means to retract 62 constitutes a proximity limit switch mounted to stock advance cylinder 91. When actuated, means to retract 62 switches a valve (not shown) in a hydraulic unit (not shown) controlling stock advance cylinder 91 with piston 23 mounted thereupon to retract at a higher speed than allowed by means to advance. Piston 23 typically retracts at a speed of approximately twice the speed allowed by means to advance however, either speed may by varied to match the desired stock advance speed or speed of retraction.

As shown in FIG. 3 and FIG. 6 piston 23 retracts below a lower end 71 of cartridge 70 when stock advance cylinder 91 retracts to its lowermost position establishing the bottom of the piston stroke. When the bottom of the piston stroke is achieved, means to clamp 26 is relieved and upper plate 21 is raised above other end 72 of cartridge 70 such that cartridge 70 may be readied for removal from stuffer device 20. In the preferred embodiment, piston 23 retracts to its lowermost position, means to clamp 26 is relieved and upper plate is moved in less than twelve seconds to a position such that cartridge 70 may be removed therefrom. Thereafter, doors 141 are opened by the operator and empty cartridge 70 is removed from receiving station 54 by grasping at least one of handles 160, 161 and sliding cartridge 70 along converging slot 57 to interlock shelf 144 whereby handles 160, 161 are utilized to lift cartridge 70 from interlock shelf 144 and be removed therefrom. Thereafter, a filled cartridge 70 may be placed within means to receive 55 by lifting cartridge 70 by handles 160, 161, placing end 71 upon interlock shelf 144 and sliding cartridge 70 along converging slot 57 into means to center 101. Cartridge 70 is then lowered into circular register recess 100, guided by diverging angle 103, into resting engagement upon base 102. Right circular cylindrical wall 104 of means to capture 105 rights cartridge 70 such that cartridge 70 is in substantial vertical alignment with registering station 110 associated with upper plate 21. Doors 141 are closed forcing stop fingers 142 into engagement with outer peripheral surface 74 of cartridge 70 and forcing cartridge 70 into engagement with pegs 143 associated with means to center 101 and registering station 110. When contact with all surfaces is effected and microswitches are closed, interlocks 145 are actuated by the operator and means to clamp 26 causes a hydraulic system to actuate hydraulic cylinders 65 to draw upper plate 21 toward lower plate 52 capturing cartridge 70 within circular register recess and registering station 110.

Stuffer device 20 is adapted to be portable and therefore usable with other molding machines. When it is desired to use stuffer device on another molding machine 30, conduit 40 may be removed from either stuffer 20 or inlet port 31, transported to another location, reconnected to the machine in the other location and restored to service by supplying feed stock 90 placed in cartridge 70 and actuating clamping and discharging sequence to supply feed stock 90 to the new machine. In the event that the new machine utilizes the same feed stock 90 as the previous machine, there is no need to remove conduit 40 or clean the discharge port 22 disposed within upper plate 21. Where the new machine utilizes a different feed stock, conduit 40 may be simply replaced with another conduit 40 already filled with the proper feed stock 90 from a previous run or a new conduit 40 having no feed stock 90 therewithin. The discharge port 22 of stuffer device 20 needs to be cleaned prior to reloading cartridge 70 containing the new polymeric feed stock 90. Although stuffer device 20 is generally utilized in an upright position having cartridge 70 disposed generally vertically therein, stuffer device 20 may be disposed horizontally upon back 18 of frame 24 on a support, such as the floor of the shop or a separate table. Stuffer device 20 may then be used to prepare billets for compression, transfer or injection molding processes by attaching a billet cutting machine to discharge port 22 wherein the billet cutting machine may be adjusted to cut precision lengths of feed stock 90 exuding from discharge port 22. The diameter of discharge port 22 may be altered to provide larger or smaller diameter billets for each particular molding process. In another embodiment, stuffer device 20 may have a rectangular or other shaped orifice disposed in discharge port 22 to provide a different shape for billet cutting machine or may be utilized to provide a shaped strip feet to an open port of an extruder or molding machine. Those skilled in the art will appreciate the portability and adaptability of stuffer device 20 to provide the services to different molding machines or different processes as herein described.

As previously explained, conduit 40 is generally a flexible conduit such as a high pressure hose having an elastomeric inner tube, multiple wire reinforcement layers and an elastomeric outer cover hose. The preferred hose for use as conduit 40 has multiple plies of wire braid and a working pressure of at least 5000 psi. A hose used as conduit 40 may be readily threaded into discharge port 22 in a threaded bore which may be provided therein and attached as well to a threaded coupling joint associated with inlet port 31. Such a hose facilitates attachment and removal of conduit 40 from one injection machine 30 to another machine 30 with little interruption is service. Since means to transfer 53 may easily be reached from below lower surface 113 of upper plate 21 when cartridge 70 is removed therefrom and discharge port 22 may be easily accessed by removal of conduit 40 therefrom, changing from one polymeric feed stock 90 to another is greatly facilitated. When removing stuffer 20 from service on one machine, there is little feed stock 90 remaining as only discharge port 22 contains any feed stock because piston 23 may be utilized to force any stock 90 from cartridge 70 through discharge port 22, stock 90 being removed therefrom and placed in a storage container. Feed stock 90 remaining in discharge port 22 may be easily forced backward through discharge port 22 and removed from means to transfer 53. Means to transfer 53 may then be readily cleaned using suitable solvents and readied for use with another polymeric feed stock 90.

In the preferred embodiment described above and shown in the accompanying figures, stuffer device 20 is loaded manually by an operator loading filled cartridges 70 weighing less than sixty-five pounds by lifting same onto means to receive 55 and removing empty cartridges 70 therefrom. As stuffer device 20 is adapted to rest upon the same floor level as the injection molding machine 30, interlock shelf 144 is elevated approximately waist level above the floor such that an average sized operator may readily load and unload stuffer device 20 without climbing a ladder or elevating feed stock 90 above a comfortable lifting height. Since all operations take place at a comfortable lifting height, an injection molding machine 30 may now be charged with a continuous stream of feed stock 90 in an operator friendly environment.

In an alternate embodiment, stuffer device may be supplied by an automated loading facility (not shown). The automated loading facility may comprise a means to elevate cartridges 70 to means to receive 55 such as an elevator mounted in front of interlock shelf 144 and may also comprise a turret device having at least two stations adapted to rotate a filled cartridge 70 from one station onto interlock shelf 144 while rotating an empty cartridge 70 in a second station away from interlock shelf. Such a turret device may be loaded and unloaded manually as in the preferred device or may be supplied by a continuous cartridge handling device. Cartridges 70 may also be moved into circular register recess 100 by a hydraulic arm attached to the back side of stuffer device 20 and fitted with a grasping device which is adapted to reach through stuffer device 20, grasp cartridge 70 from a turret device, move cartridge 70 along converging slot 57 a lower cartridge 70 into means to center 101. Doors 141 may be closed using hydraulic cylinders or stop fingers 142 may be hydraulic actuated cylinders mounted on support and guide rods 67 or from corner posts of upper cabinet 140. A fully automated clamping and discharging sequence may then be programmed into means to control 60.

Larger stuffer devices 20 utilizing larger cartridges 70 may be constructed necessitating the use of an elevator device to lift cartridges 70 to means to receive 55. Although such larger cartridges may still be manipulated manually within stuffer device 20, an automated loading and unloading device as described above may be required.

Stuffer device 20 may further contain a means to heat each or all of cartridge 70, means to transfer 53 and conduit 40 in order to provide heated feed stock 90 to an injection molding machine 30 as some polymeric feed stock will require heating in order to lower the intrinsic viscosity sufficiently to effect transfer of feed stock 90. As such, stuffer device 20 may be fitted with a clam shell heating blanket openable toward means to receive 55 such that cartridge 70 may be received therein. Means to transfer 53 may be fitted with strip heaters on either or both surfaces 113 or 114 or may be fitted with bayonet heaters inserted into receiving sockets in upper plate 21. Conduit 40 may be fitted with strip heaters, tape wrapped heaters or clam shell blanket heaters enclosing conduit 40. The various heating devices may then be controlled by means to control 60 operating in concert with each loading and unloading sequence.

Means to control 60 is interlocked with the control mechanism of injection molding machine 30 such that stuffer device 20 need only operate when injection machine 30 requires feed stock 90 to be supplied to inlet port 31. Means to control 60 comprises an electronic microprocessor, an interlock cable for attaching to an associated injection molding machine 30, a two stage hydraulic pump, operator interlocks 145, a distribution manifold and the associated control valves mounted to the distribution manifold. The two stage pump has a low speed for advancing piston 23 during discharge of feed stock 90 and a high speed for advancing piston 23 into engagement with feed stock 90 and for retracting piston 23 to its lowermost position.

Stuffer device 20 has a frame 24 having a base 32, upright corner posts 33 and a top 34 constructed of one to three inch, but preferably two inch steel angle iron welded together at each juncture. Mounted approximately midway between base 32 and top 34 is lower plate 52. Lower plate 52 is constructed of cold rolled steel plate from two to five inches but preferably three and one half inches in thickness having a width of from about ten to twenty inches but preferably fourteen and one half inches and a length of from about twenty to thirty inches but preferably twenty eight and one half inches. Lower plate 52 has three to eight inch but preferably a six inch bore 73 machined through from lower surface 66 to upper surface 59 and centrally disposed in the length and width thereof. As best observed in FIG. 5, upper surface 59 further has a converging slot 57 at least one eighth inch and preferably three sixteenths inch deep machined from a front edge 35 tangent to bore 73 establishing walls 36 of slot 57. Machined into upper surface 59 is a circular register recess 100 approximately equal to the outside diameter of a cartridge 70 to be received therein. Circular register recess 100 is approximately one half inch in diameter larger than bore 73 and in this preferred embodiment is therefore six and one-half inches in diameter and is machined to a depth at least one sixteenth inch and preferably one eighth inch below a plane 58 contiguous with the base 102 of slot 57. Circular register recess 100 has a wall 104 and a base 102, base 102 being one quarter inch in width and wall 104 being approximately five sixteenths inch in height. Circular register recess 100 has a portion of means to center 101 comprising an outwardly diverging angle 103 of fifteen degrees from the vertical machined on an extension of wall 36 surrounding circular register recess 100 forming conical wall 106. Outwardly diverging angle 103 may be between 8 and 20 degrees but it has been found by the teachings of this invention that an angle of fifteen degrees from the vertical is best suited for centering cartridge 70 in circular recess 100.

Machined through lower plate 52 approximately three and one half inches from the edge and three and three quarters inch from face 35 or opposing rear face (not shown) of each orthogonal corner is a precision bore 85 for accepting a bushing 69 therein. Each bore 85 is approximately two and five eighths inches in diameter completely through plate 52. Bushing 69 is press fitted into bore 85 approximately one inch and is retained therein by ¼–20 UNC cap screws disposed into threaded bores in upper surface 59 of lower plate 52. Centered in each bushing 69 is support and guide rod bore 68 having a diameter of one and five eighths inches. Spaced equally around bore 85 are four twenty nine thirty secondths diameter cylinder mounting holes 82 bored through plate 59 for receiving the 7/8–14 UNF cylinder mounting studs 29 therein. Each bore 82 further has a one and one eighth inch deep counterbore 84 machined from top surface 59 for accepting a nut 81 therein upon the open terminal end 83 of mounting studs 29. Lower plate 52 is mounted to each upright corner post 33 by machine screws through each leg of corner posts 33 into threaded bores (not shown) in each edge and end of lower plate 52.

An interlock shelf 144 is formed approximately thirteen and three quarters inches in width and approximately six inches in depth from three eighths inch thick cold rolled plate and has a three inch mounting flange welded at a right angle from a back edge 148 thereof. The mounting flange mounts to front face 35 of lower plate 52 with the upper surface 149 of interlock shelf 144 positioned at plane 58. Interlock shelf 144 thus becomes an extension of converging slot 57 and a part of means to receive 55. Upper surface 149 of interlock shelf is machined smooth to facilitate sliding of cartridge 70 thereupon. Mounted underneath interlock shelf 144 are manual interlocks 145. Manual interlocks 145 are electrically connected to means to control 60.

Bushings 69 are machined from round brass stock approximately four inches in diameter. Each bushing 69 is approximately three and one quarter inches in length having a reduced portion equal in diameter to bore 85 in lower plate 52. Bushings 69 have a precision bore through the center thereof of one and one half inches in diameter for accepting support and guide rods 67 therein. Bushings 69 are press fit into bores 85 in the orthogonal comers of lower plate 52 and secured upon top surface 59 by socket head cap screws threaded into threaded bores in bottom plate 59.

As best observed in FIGS. 6 and 7, piston 23 is machined from a six and one quarter inch diameter billet of brass and is approximately three and one half inches in length from base 17 to top 28. Piston 23 is machined to an outside diameter of six inches equal to the diameter of bore 73 in lower plate 52 and diameter 79 of cartridge 70. Into the outer periphery 135 of piston 23, a seal groove 11 is machined having a depth of three eighths inch and a width of five eighths inch in order to accept a common vertical packing seal 96 therein. Packing seal 96 has an annular lip 97 at the upper edge thereof with a relief 98 below lip 97. Lip 97 provides for the release of gas around piston 23 in much the same manner as gas passes around seal 132 in groove 131. Lip 97 does not permit passage of viscous fluid such as the feed stock 90 used herein as lip 97 is in wiping contact with smoothly honed interior 99 of cartridge 70. Thus, seal 96 permits removal of gas from below feed stock 90 as piston 23 moves into contact therewith. Groove 11 is machined approximately midway between base 17 and top 28. Piston 23 has tapered surfaces 137 machined upon top 28 thereof. Tapered surfaces 137 correspond exactly to tapered surfaces 117 and 119 within means to transfer 53 in upper plate 21 and hence the outermost tapered surface has an angle of approximately eight degrees from the horizontal while the adjacent inner tapered surface has an angle of approximately thirty degrees from the horizontal while the innermost portion of top 28 of piston 23 is flat. These angles and the innermost flat portion of top 28 facilitate the dome shape of feed stock 90 when being pressed into engagement with discharge port 22 or any remaining feed stock 90 therewithin. Threaded base 17 is adapted to thread into the end 86 of cylinder rod 92 and preferably has an external diameter of approximately two and one half inches having 2½–12 UNF threads cut thereupon. Piston 23 may be made from any suitable material but is preferably machined from brass as it has been found by the teachings of this invention that the buildup of any electrostatic charge when pressing feed stock 90 from cartridge 70 is fully dissipated by using a brass piston 23.

Stock advance cylinder 91 having a cylinder bore of six inches and a stroke of approximately twenty six inches is affixed to lower surface 66 of lower plate 52 and depends therefrom. Cylinder 91 is mounted to lower plate 52 using four 1¼–12 UNF bolts 93 approximately ten inches in length which are inserted through lower plate 52 from top surface 59 through bores 95 and mounting holes 88 in cylinder end plate 87. A spacer 120 having a one and one quarter inch bore may be used between lower plate 52 and cylinder 91 necessitating passing bolts 93 therethrough before passing through mounting holes 88. Once cylinder 91 is arranged in place with bolts 93 passing through all mounting holes, nuts 94 with lock washers 121 are placed upon ends 122 of bolts 93 and are secured thereupon by tightening each nut 94 against an associated lock washer 121 and against base surface 89 of cylinder end plate 87. Cylinder 91 has a cylinder rod 92 extending from the end of the cylinder bore having an end 86. End 86 is a threaded bore approximately two and one half inches in diameter having 2½–12 UNF threads for accepting the threaded base 17 of a piston 23 therein.

Four clamping cylinders 65 are then mounted near the orthogonal corners of lower plate 52 on the lower surface 66 thereof. Each cylinder 65 is mounted with four 7/8–14 UNF threaded cylinder mounting bolts 29 passing lengthwise through mounting flanges on both ends of cylinder 65 and passing through holes 82. The end 83 of each bolt 29 extends into a counterbore 84 machined into upper surface 59 and a 7/8–14 UNF jam nut 81 is threaded thereupon.

Support and guide rods 67 are made from one and one half inch diameter stainless steel bar stock having 1½–12 UNF threads upon each end. One end of support and guide rods 67 has a chisel point machined upon the terminal end thereof for fitting into and bottoming out in a blind hole 61 in a cylinder rod of a clamping cylinder 65. The opposite end 15 of support and guide rods 67 have threads extending approximately eight inches therefrom to accept top plate 21 therethrough and be secured thereupon by nuts 14. Nuts 14 are ground smooth on each surface thereof and perpendicular to a central axis of support and guide rod 67 in order to firmly attach top plate 21 thereto without binding.

The chisel point end of each support and guide rod 67 is passed through its respective bushing 69, through precision bore 85 in lower plate 52, into blind hole 61 in clamping cylinder rod 63 and threaded thereinto until the chisel point bottoms out in blind hole 61. The bottoming out of chisel point establishes an exact reference point for the length of support and guide rod 67 to ensure that upper plate 21 is precisely located from bottom plate 52.

Top plate 21 is also constructed of cold rolled steel plate approximately three and one half inches in thickness having a width of approximately eleven inches and a length of approximately twenty five inches. Upper plate 21 has a seven inch bore disposed in lower surface 113 to a depth of one and three quarters inches and a five inch bore continuing therethrough to upper surface 114, this bore receiving insert 19 therein. Insert 19 is machined from a seven and one half inch diameter stainless steel billet and has a two inch bore 47 to accommodate a two inch NPT hose fitting comprising discharge port 22 machined through from upper surface 114 to a means to transfer 53. Insert 19 is slip fit into the seven inch bore and retained therein with four ¼–20 socket head cap screws. Means to transfer 53 comprises tapered surfaces 116 and a straight short section 128, tapered surfaces 116 increasing in angle from the horizontal from short section 128 to discharge port 22. In the preferred embodiment, tapering surface 116 comprises three conical sections, 117, 119 and 123 having angles of taper of 118, 124 and 125 respectively. Angle 118 is approximately eight degrees from the horizontal, angle 124 is approximately thirty degrees from the horizontal while conical angle 125 is approximately sixty degrees from the horizontal. Conical sections 117 and 123 each have a diametral length of approximately one half inch while conical section 119 has a diametral length of approximately one and one half inch. Conical sections 117, 119, and 123 are machined into a recess in bottom surface 113 beginning at a terminal end of short straight section 128 and terminating at discharge port 22. Short straight section 128 is approximately one eighth inch in height and is a right circular cylindrical bore equal in diameter to inside diameter 79 of cartridge 70. Upper plate 21 has a right circular recess forming upper circular recess 111 machined approximately one half inch in depth from lower surface 113 to plane 112 having a circular wall 129 terminating in a flat base 109 at plane 112. Flat base 109 is equal in width to wall thickness 75 of wall 76 of cartridge 70 and thus is approximately one quarter inch in width. A seal groove 131 is machined into the right circular wall 129 of upper circular recess 111. Seal groove 131 is approximately one quarter inch in height and depth and is adapted to receive a vertical packing seal 132 therein. Also machined through upper plate 21 approximately one and three quarters inches from each edge of each orthogonal corner is a support and guide rod bore 51 having a diameter of one and one half inches which is adapted to receive one end of support and guide rod 67 therethrough. Upper plate 21 has at least two lifting lugs 16 threaded into threaded bores in upper surface 114 for lifting upper plate into position during assembly and for lifting stuffer device 20 in service. Seals 96 and 132 may be obtained from H. K. Porter as part number U37-5.25-62B and U25-6.50-SQB respectively.

Pegs 143 are formed from cold rolled one inch square bar stock and have a curved machined front surface 147 having a radius equal to outer peripheral surface 74 of cartridge 70. Pegs 143 are approximately two inches in length and have a one half inch diameter boss (not shown) machined upon one end thereof which is press fitted into a drilled hole in lower surface 113 of upper plate 21 adjacent upper circular recess 111 such that front surface 147 is contiguous with the right circular wall 129 of circular recess 111 and thus becomes an extension thereof. Pegs 143 are installed adjacent circular recess 111 to prevent cartridge 70 from tilting beyond upper circular recess 111 when inserted into stuffer device 20.

Discharge port 22 may be threaded with 2" NPT to accept the threaded end of conduit 40 or may have a smooth bore conduit pipe press fitted therein. In the preferred embodiment, a two inch inside diameter flexible rubber hose is used as conduit 40 having threaded couplers on both ends thereof for attaching to discharge port 22 and inlet port 31.

One nut 14 is threaded upon upper end 15 of each support and guide rod 67 and run down to approximately the bottom of the threaded portion of support and guide rod 67. Upper plate 21 is lifted above top frame 34 and lowered therethrough and mounted upon support and guide rods 67 having support and guide rods 67 extending though bores 51 coming to rest upon the nuts 14 on each of the support and guide rods 67. Upper plate 21 is leveled with lower plate 52 by adjusting the support nuts 14 on the underside 113 of upper plate 21. Since nuts 14 are machined square with the threads of support and guide rods 67, leveling of upper plate 21 is greatly facilitated. After leveling upper plate 21 such that lower surface 113 is equidistant at every point thereon with corresponding points on upper surface 59 of lower plate 52, another nut 14 is threaded upon each support and guide rod 67 and secured against upper surface 114 of upper plate 21. Thereafter, a third nut 14 is threaded upon the nut 14 above upper surface 114 as a jam nut to prevent movement of plate 21 with respect to support and guide rods 67. Upper plate 21 is thus supported entirely by support and guide rods 67 and is therefore adapted to move away from and toward lower plate 52 in order to clamp cartridge 70 therebetween.

A hydraulic pumping unit is placed within the lower portion 49 of the framework 24 and secured to the upright corner angle irons 33 with machine screws through the base mounting holes and attached thereto with nuts upon the open end of the machine screws. A distribution manifold is mounted adjacent the hydraulic pump, the discharge of the pump adapted to pump hydraulic fluid into the distribution manifold. Electrically actuated hydraulic valves are mounted upon the distribution manifold for stock advance cylinder 91 and clamping cylinders 65. Hydraulic tubing is routed from each clamping cylinder 65 to an associated hydraulic valve with a return tube routed to the inlet side of the pump. Similarly, hydraulic tubing is routed to stock advance cylinder 91 from its associated valve with a return to the inlet of the pump. Electrical connections are made from each of the valves, each of the electrical interlocks and the pump to control means 60. Once all connections are made, an outer covering 130 of sheet metal is formed and secured to upright corner angle irons 33 of frame 24 with sheet metal screws or machine screws.

A similar sheet metal cabinet 140 is formed for the upper portion of frame 24 but encompasses only both ends and the back of frame 24. The front face of the upper portion of frame 24 has expanded metal doors 141 affixed with hinges to each front upright corner angle irons, doors 141 adapted to meet substantially at the mid point of the front face and substantially centered about cartridge 70 when installed therein. Doors 141 each have an elongated stop finger 142 affixed to the inside 146 thereof at the mating edge 138 of the door 141. One stop finger 142 is mounted near the upper edge of door 141 as shown in FIG. 2 in the right hand door 141. The other stop finger 142 is mounted near the bottom edge of opposite door 141 (not shown). Stop fingers are approximately four inches in length and are adapted to touch outer peripheral surface 74 of cartridge 70.

Cartridge 70 is typically cut approximately to a length of approximately twenty six inches from an elongated section of six and one half inch outside diameter steel seamless tubing having interior surface 99 smoothly honed. Outer peripheral surface 74 is left as received except for polishing approximately 10 mm in length at each end 71 and 72. Carrying handle 160 is welded to outer peripheral surface 74 centrally located between end 71 and end 72 while manipulating handle 161 is welded to outer peripheral surface 74 approximately equally spaced from handle 160 and end 71. Ends 71, 72 are ground smooth and square with wall 76.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. A stuffer device for supplying a substantially continuous stream of elastomeric feed stock in a fluid state to an inlet port of at least one injection molding machine, said device remote from said injection molding matching and comprising a feed stock advancing unit, a conduit associated therewith for connecting said feed stock advancing unit to said inlet port, and means for controlling said feed stock advancing unit to provide a measured amount of feed stock to said inlet port commensurate with the needs of each injection cycle.

2. A device as in claim 1 wherein said feed stock advancing unit has an upper clamping plate, a lower clamping plate and a means to clamp an elongated feed stock cartridge between said upper clamping plate and said lower clamping plate, said upper clamping plate moveable toward said lower clamping plate, said upper plate further having means to transfer associated therewith to transfer said feed stock to said injection molding machine.

3. A device as in claim 2 wherein said remote feed stock advancing unit further has a receiving station associated with said lower plate.

4. A device as in claim 3 wherein said receiving station has means to receive one end of said elongated feed stock cartridge therein.

5. A device as in claim 4 wherein said means to receive said elongated cartridge comprises means to guide said one end of said cartridge within said receiving station.

6. A device as in claim 5 wherein said means to guide said one end of said cartridge comprises an elongated converging slot in a plane below a top surface of said lower plate.

7. A device as in claim 6 wherein said elongated converging slot terminates in a circular register recess in said lower plate, said register recess comprising means to initially center said cartridge.

8. A device as in claim 7 wherein said circular register recess is disposed below said plane.

9. A device as in claim 8 wherein said circular register recess comprises means to capture said one end of said cartridge.

10. A device as in claim 7 wherein said register recess has an outwardly diverging angle on a wall thereof.

11. A device as in claim 10 wherein said angle is between 8 and 20 degrees.

12. A device as in claim 11 wherein said angle is 15 degrees.

13. A device as in claim 4 wherein said remote feed stock advancing unit has a registering station associated with said upper plate to accept another end of said elongated feed stock cartridge in said registering station.

14. A device as in claim 13 wherein said registering station comprises a circular upper register recess in said upper plate, said register recess disposed in a plane above a lower surface of said upper plate.

15. A device as in claim 14 wherein said lower plate receives said cartridge in said register recess, said upper plate is moved toward said lower plate, said upper plate receiving said cartridge in said upper register recess, said means to clamp clamping said cartridge between said recesses.

16. A device as in claim 14 wherein said upper register recess is centrally disposed about said means to transfer in said upper plate.

17. In a system of injection molding elastomeric compound, said system comprising at least one injection molding machine, a mold for said injection molding machine and a stuffer device for supplying a substantially continuous stream of elastomeric feed stock in a fluid state to an inlet port of said at least one injection molding machine, the improvement wherein said stuffer device comprises a feed stock advancing unit remote from said injection molding machine having a conduit associated therewith connecting said feed stock advancing unit to each said inlet port, said stuffer device having means for controlling said feed stock advancing unit to provide a measured amount of feed stock to each said inlet port commensurate with the needs of each injection cycle.

18. A system as in claim 17 wherein each said conduit is a flexible conduit.

19. A system as in claim 18 wherein each said flexible conduit is a high pressure hose having an elastomeric inner tube, multiple wire reinforcement layers and an elastomeric outer cover.

\* \* \* \* \*